(12) United States Patent
Takasu

(10) Patent No.: US 7,100,755 B2
(45) Date of Patent: Sep. 5, 2006

(54) ONEWAY CLUTCH ASSEMBLY

(75) Inventor: Yasuhide Takasu, Shizuoka-ken (JP)

(73) Assignee: NSK-Warner K.K., Tokyo (JP)

( * ) Notice: Subject to any disclaimer, the term of this patent is extended or adjusted under 35 U.S.C. 154(b) by 0 days.

(21) Appl. No.: 10/948,194

(22) Filed: Sep. 24, 2004

(65) Prior Publication Data

US 2005/0067248 A1    Mar. 31, 2005

(30) Foreign Application Priority Data

Sep. 29, 2003  (JP) .............................. 2003-338459

(51) Int. Cl.
    *F16D 41/07*    (2006.01)
(52) U.S. Cl. .................................... 192/45.1
(58) Field of Classification Search ...................... None
    See application file for complete search history.

(56) References Cited

U.S. PATENT DOCUMENTS

| 4,018,318 | A | * | 4/1977 | Hallerberg ................ | 192/41 A |
| 4,494,636 | A | * | 1/1985 | Wakabayashi et al. .... | 192/41 A |
| 4,979,600 | A | * | 12/1990 | Zanoni ...................... | 192/41 A |
| 5,038,903 | A | * | 8/1991 | Akagi et al. ............... | 192/41 A |
| 6,138,803 | A | * | 10/2000 | Muramatsu et al. ....... | 192/41 A |
| 6,167,998 | B1 | * | 1/2001 | Kinoshita .................. | 192/45.1 |
| 6,814,203 | B1 | * | 11/2004 | Kamiya et al. ............ | 192/45.1 |

FOREIGN PATENT DOCUMENTS

| JP | UM63-94330 | 6/1988 |
| JP | UM63-139334 | 9/1988 |
| JP | UM04-32335 | 3/1992 |

\* cited by examiner

*Primary Examiner*—Richard M. Lorence
(74) *Attorney, Agent, or Firm*—Miles & Stockbridge PC

(57) ABSTRACT

A oneway clutch assembly comprises an outer race and an inner race, torque transmitting members disposed between the outer race and the inner race, a biasing spring for biasing the torque transmitting members, side plates disposed on the both sides of the torque transmitting members in the axial direction thereof, and detachment preventing means for restricting movements of the torque transmitting members, the biasing spring, and the side plates in the axial direction, and being elastically engaged with the outer race or the inner race. One of the side plates is provided with an engagement projection extended in the axial direction and the engagement projection is fitted in the detachment preventing means.

3 Claims, 5 Drawing Sheets

ONEWAY CLUTCH ASSEMBLY

This application claims the benefit of Japanese Patent application No. 2003-338459 which is hereby incorporated by reference.

BACKGROUND OF THE INVENTION

1. Field of the Invention

The present invention relates to a one-way clutch assembly which is used, for example, in a starter of a motorcycle or the like.

2. Related Background Art

In the oneway clutch assembly, the constituent members thereof except an outer race, an inner race and a C-shaped retaining ring (hereinafter called the main body unit of the oneway clutch) are rotated slowly between the outer and inner races depending on increase, decrease, or the like, of vibrations or the number of rotations of the engine. This rotation is required for preventing a local abrasion of the outer race or the inner race, and the speed of this rotation is adjusted by an elastic ring or the like provided on a side plate or the like. The technologies therefor are disclosed, for example, in Japanese Utility Model Application Laid-Open Nos. 63-94330, 63-139334 and 4-32335.

For example, in Japanese Utility Model Application Laid-Open No. 63-94330, the oneway clutch is provided with a plurality of sprags which are annularly interposed between the inner race and the outer race, a garter spring for biasing these sprags in the direction of engagement between the inner and outer races, an annular wire retainer alternately having axial parts and circumferential parts for retaining the respective sprags, and an annular side plate interposed between an end surface of the sprag and the retainer to be slidably retained between the inner and outer races.

A window portion is provided on the outer peripheral part of this annular side plate, and an engagement projection of a frictional engagement ring (C-shaped retaining ring) is inserted in this window portion to be engaged therewith. This frictional engagement ring is arranged to be expanded and elastically contacted with the inner peripheral surface of the outer ring.

With this arrangement, at the time of non-engagement of the sprags, that is, at the time of idling rotation of the outer race or the inner race, the engagement projection of the frictional engagement ring which is inserted into the window portion of the annular side plate and expanded to be elastically contacted with the inner peripheral surface of the outer ring rotates the annular side plate to follow the idling rotation of the outer ring. This rotation of the annular side plate causes rotation of a group including the retainer and the sprags (the main body unit of the oneway clutch) in a body.

As a result, though rotating substantially together or in a body with the idling rotation of the outer race, the main body unit of the oneway clutch is rotated gradually around the outer race relatively thereto, depending on an increase or a decrease in the vibrations or the number of rotations of the engine. Thereby, it is rendered possible to prevent local abrasion of the outer race or the inner race, and at the same time, to securely shift an idle rotation of the oneway clutch to a meshing operation without sliding.

In Japanese Utility Model Application Laid-Open No. 63-94330, a window portion is provided on the outer peripheral part of the annular side plate, and an engagement projection of a frictional engagement ring (C-shaped retaining ring) is inserted in this window portion to be engaged therewith.

However, the annular side plate has a flange which is projected in the axial direction on the outer peripheral end thereof and the above-described window portion is provided on this flange, so that the width dimension in the axial direction thereof is disadvantageously increased by the projected portion of the flange.

There is also a demand for further increase of a frictional torque between the main body unit of the oneway clutch and the outer race or the like at the idling rotation time of the outer race or the like.

SUMMARY OF THE INVENTION

The present invention has been contrived taking circumstances as described above into consideration, and an object thereof is to provide a oneway clutch assembly which is capable of reducing the width dimension in the axial direction thereof to the minimum and, at the same time, of further increasing a frictional torque between the main body unit of the oneway clutch and the outer race, or the like, at the time of idling rotation of the outer race or the like.

In order to achieve the above object, according to the present invention, there is provided a one-way clutch assembly comprising: an outer race and an inner race; torque transmitting members disposed between the outer race and the inner race; a biasing spring for biasing the torque transmitting members; side plates disposed on the both sides of the torque transmitting members in the axial direction thereof; and detachment preventing means for restricting movements of the torque transmitting members, the biasing spring, and the side plates in the axial direction, so as to be elastically engaged with the outer race or the inner race, wherein the side plates are provided with engagement projections extended in the axial direction and the engagement projections are fitted in the detachment preventing means.

In the oneway clutch assembly according to the present invention, the detachment preventing means is preferably a C-shaped retaining ring.

In the oneway clutch assembly according to the present invention, the engagement projection is preferably fitted in between ends of an opening of the C-shaped retaining ring.

In the oneway clutch assembly according to the present invention, the detachment preventing means is preferably a large side plate which is elastically engaged with the outer race.

In the oneway clutch assembly according to the present invention, it is preferable that the large side plate is provided with a window and the engagement projection is inserted with pressure in the window.

According to the present invention, an engagement projection extending in the axial direction is provided on an annular side plate, and this engagement projection is fitted in between an opening of a frictional engagement ring (C-shaped retaining ring). As a result, it is rendered possible to reduce the width dimension in the axial direction thereof to the minimum, and at the same time, to further increase a frictional torque between the main body unit of the oneway clutch and the outer race, or the like, at the time of idling rotation of the outer race or the like.

DESCRIPTION OF THE PREFERRED EMBODIMENTS

Description will be made below on a one-way clutch assembly according to embodiments of the present invention with reference to drawings.

First Embodiment

Figure 1:
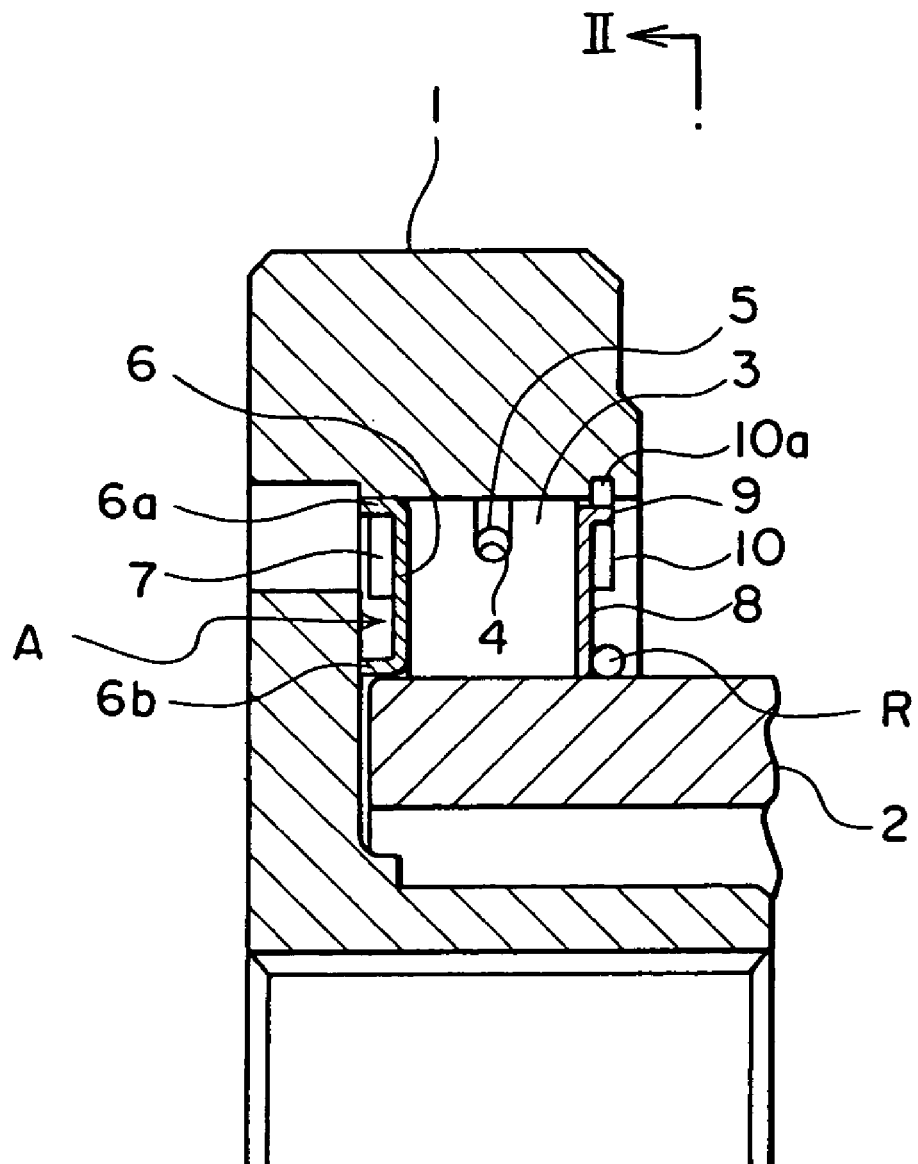
FIG. 1 is a cross-sectional view of a one-way clutch assembly according to a first embodiment of the present invention.

FIG. 1 is a cross-sectional view of a one-way clutch assembly according to the first embodiment of the present invention.

Figure 2:
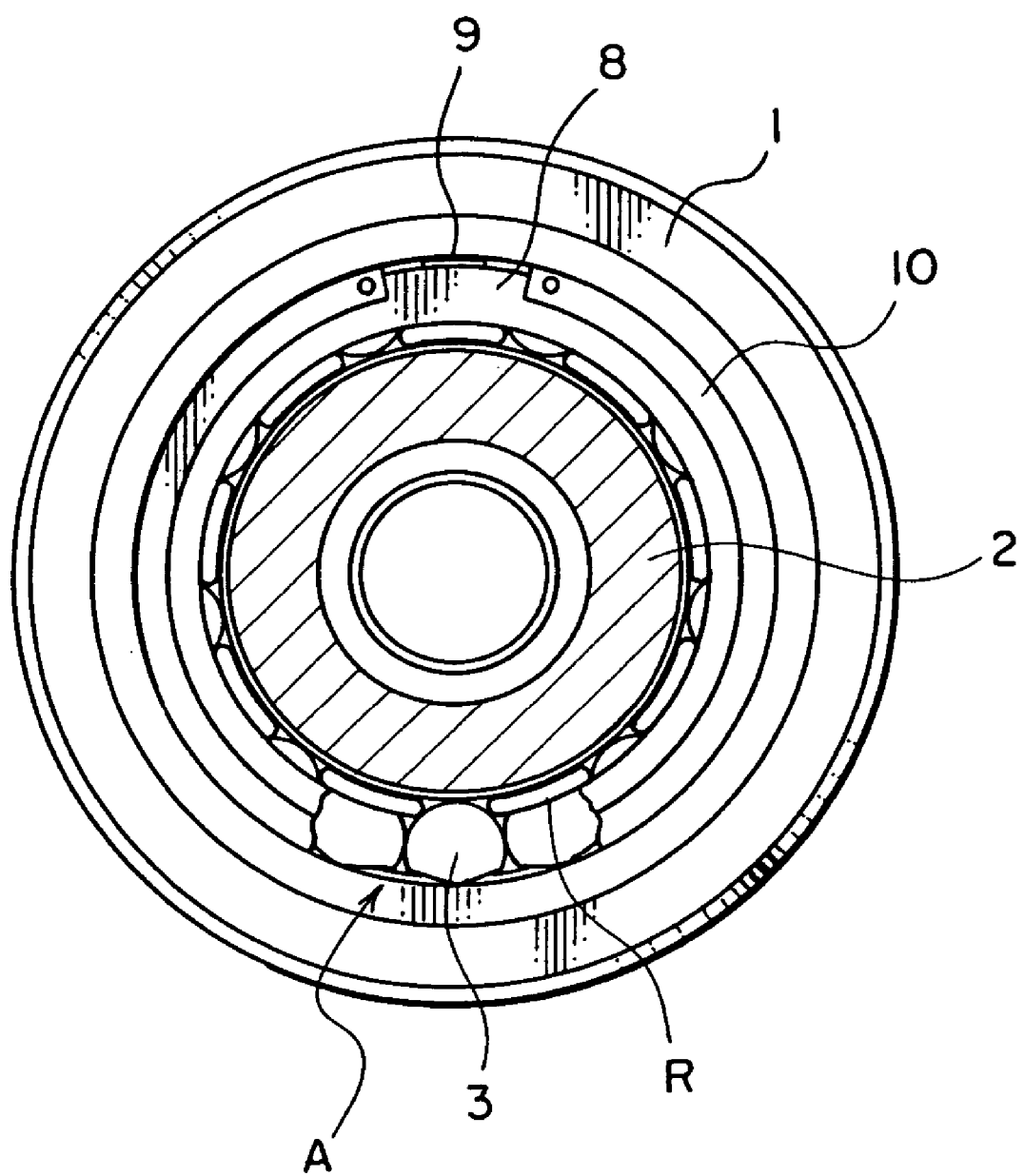
FIG. 2 is a cross-sectional view taken along the line II—II in FIG. 1.

FIG. 2 is a cross-sectional view taken along the line II—II in FIG. 1.

Figure 3A:
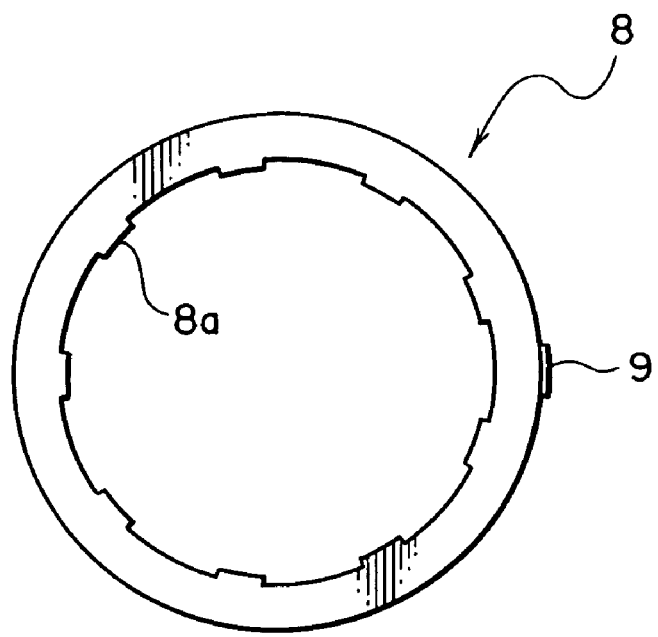
FIG. 3A is a side view of a small side plate and FIG. 3B is a cross-sectional view of the small side plate.
Figure 3B:
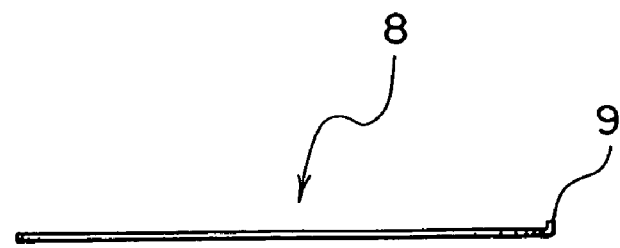

FIG. 3A is a side view of a small side plate and FIG. 3B is a cross-sectional view of the small side plate.

In the oneway clutch assembly according to the present embodiment, sprags serving as torque transmitting members 3 are disposed between an outer race 1 and an inner race 2, and a groove 4 is formed on the outer periphery of each torque transmitting member 3 (sprag) around which a garter spring 5 is wound.

This garter spring 5 imparts a biasing force for inclining each torque transmitting member 3 (sprag) in an engageable direction. Note that the torque transmitting members 3 (sprags) are retained at regular intervals in the circumferential direction by a wire retainer R (wire cage).

A side plate 6 having a U-shaped cross section (hereinafter called the "U-shaped side plate") is disposed on a side of the torque transmitting member 3 on the closed side of the outer race 1, and a hole (not shown) is formed on a flange 6a on the outer peripheral side of the side plate 6. An engagement projection (not shown) formed on the outer periphery of a frictional engagement ring 7, is extended outward in the radial direction and is passed through this hole, so as to be brought into frictional engagement with the inner peripheral surface of the outer race 1, thereby producing a frictional torque.

On the other hand, a substantially annular side plate 8 (hereinafter also called the small side plate) is disposed on a side part of the outer race 1 on the opened side thereof. As shown in FIGS. 3A and 3B, an engagement projection 9 is provided to be projected in an axial direction on the outer peripheral edge of this small side plate 8. Note that, as shown in FIGS. 3A and 3B, a plurality of claws 8a are formed on the inner peripheral surface of the small side plate 8.

This engagement projection 9 is positioned in between the both ends of an opening of a frictional engagement ring-shaped member 10 which is a C-shaped retaining ring, as shown in FIG. 1 and FIG. 2. Note that an outer peripheral end 10a of the frictional engagement ring-shaped member 10 (C-shaped retaining ring) is fitted in the inner peripheral surface of the outer race 1.

With the above structure, when the main body unit A of the oneway clutch is to be rotated, the engagement projection 9 is engaged with the opening end of the frictional engagement ring-shaped member 10 (C-shaped retaining ring) so that a frictional force is caused to work on the main body unit A of the oneway clutch by an elastic force of the frictional engagement ring-shaped member 10 (C-shaped retaining ring) for expanding the diameter thereof.

With this arrangement, at a non-engagement time of the torque transmitting members 3 (sprags), that is, at the time of idling rotation of the outer race 1, the frictional engagement ring-shaped member 10 (C-shaped retaining ring) rotates the small side plate 8 to follow the idling rotation of the outer race 1, and this rotation of the small side plate 8 causes a rotation of a group including the retainer R and the sprags 3 (the main body unit A of the one-way clutch) in a body.

As a result, though rotating substantially together or in a body with the idling rotation of the outer race 1, the main body unit A of the one-way clutch is rotated gradually around the outer race 1 relatively thereto depending on an increase or a decrease in vibrations or the number of rotations of the engine. Thereby, it is rendered possible to prevent local abrasion of the inner race 2 and, at the same time, to securely perform an operation for shifting the idling rotation of the oneway clutch to the engagement without causing a slide.

According to the present embodiment, the annular small side plate 8 is provided with the engagement projection 9 which is extended in the axial direction, and this engagement projection 9 is positioned between the opening ends of the frictional engagement ring-shaped member 10 (C-shaped retaining ring). Accordingly, it is rendered possible to reduce the width dimension in the axial direction to the minimum, and at the same time, to further increase the frictional torque between the main body unit A of the oneway clutch and the outer race 1, or the like, at the time of idling rotation of the outer ring 1, or the like.

Second Embodiment

Figure 4:
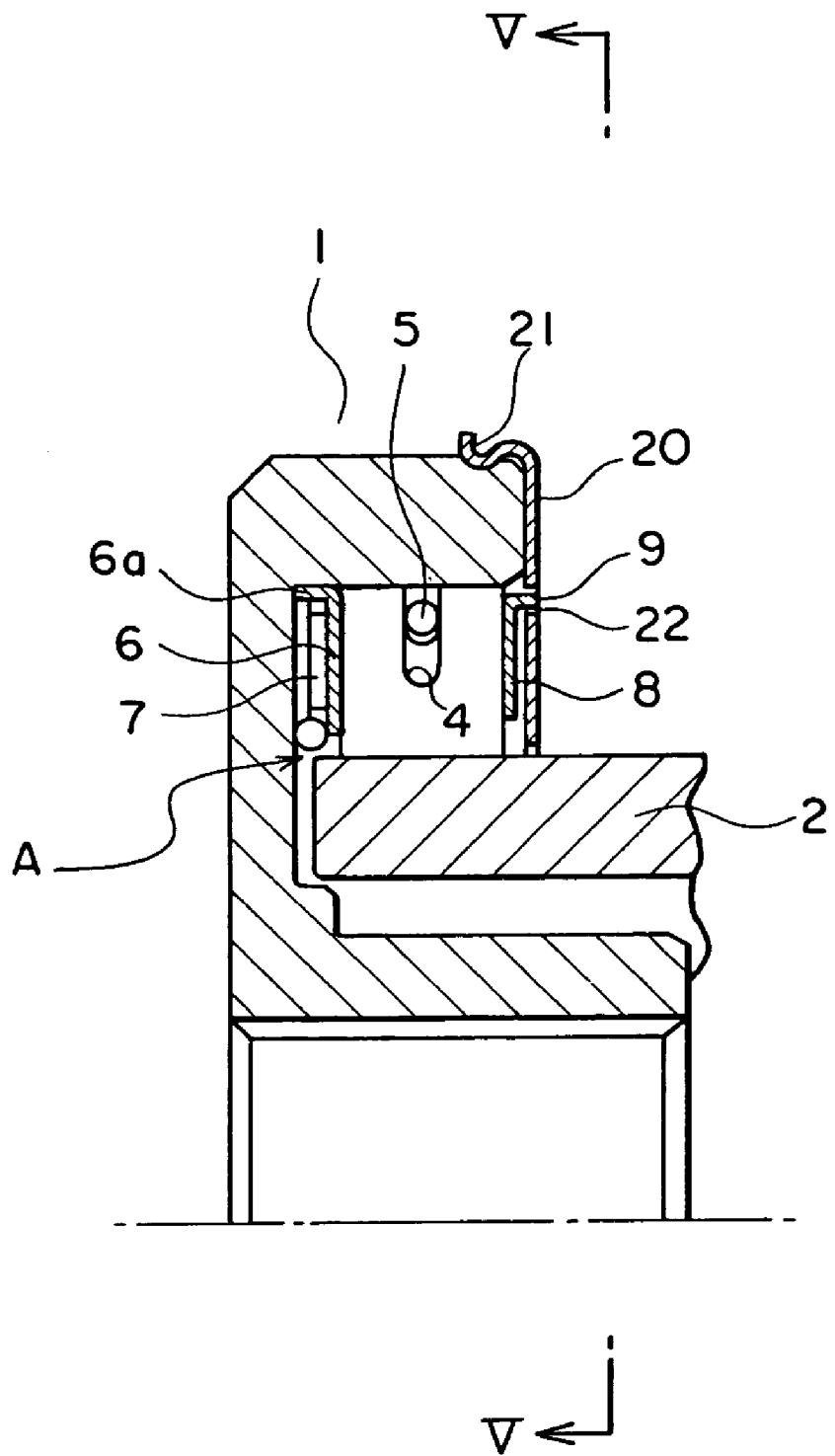
FIG. 4 is a cross-sectional view of a one-way clutch assembly according to a second embodiment of the present invention.

FIG. 4 is a cross-sectional view of a one-way clutch assembly according to the second embodiment of the present invention.

Figure 5:
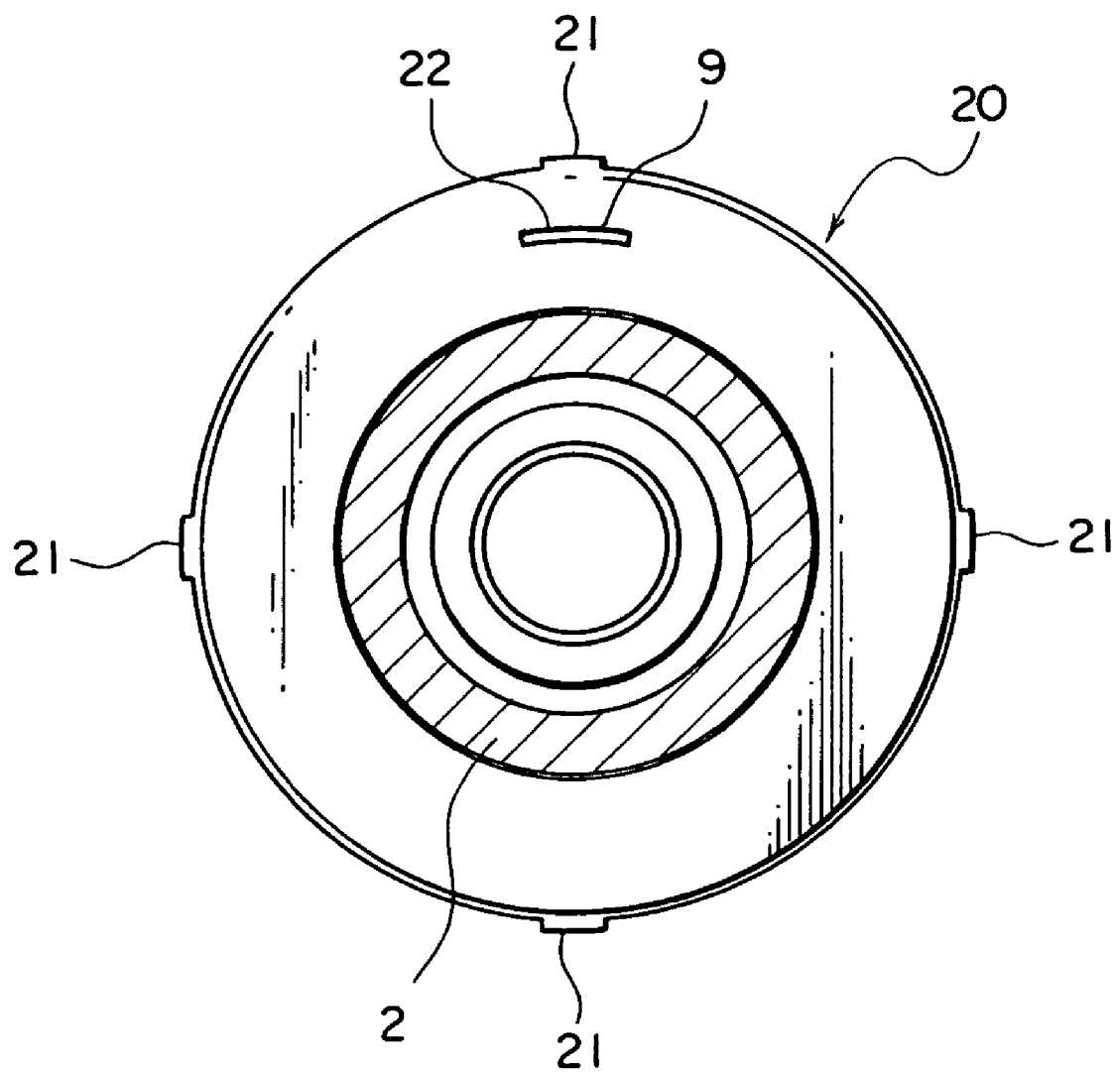
FIG. 5 is a cross-sectional view taken along the line V—V in FIG. 4.

FIG. 5 is a cross-sectional view taken along the line V—V in FIG. 4.

The second embodiment has the same basic structure as that of the first embodiment described above, so that description thereof will be omitted.

In the second embodiment, there is provided a side plate 20 (hereinafter called the large side plate) which is elastically engaged with the outer periphery of the outer race 1, instead of the frictional engagement ring-shaped member 10 (C-shaped retaining ring), so as to restrict an axial movement of the main body unit A of the oneway clutch.

As shown in FIG. 4 and FIG. 5, a plurality of engagement pieces 21 which are bent in the axial direction and in the radial direction to be elastically engaged with the other periphery of the outer race 1 are formed on the outer periphery of the large side plate 20.

The large side plate 20 is provided with a window 22, and an axial engagement projection 9 formed on the small side plate 8 is fitted in the window 22 of the large side plate 20.

With such a structure, when the main body unit A of the oneway clutch is to be rotated, the window 22 of the large side plate 20 is brought into engagement with the engagement projection 9 of the small side plate 8, so that a frictional force due to the elastic force of the engagement pieces 21 of the large side plate 20 is caused to work.

As a result, though rotating substantially together or in a body with the idling rotation of the outer race 1, the main body unit A of the one-way clutch is rotated gradually around the outer race 1 relatively thereto depending on an increase or a decrease in the number of vibrations or rotations of the engine. Thereby, it is rendered possible to prevent local abrasion of the inner race 2 and, at the same time, to securely perform an operation from the idling rotation of the oneway clutch to the engagement without causing a slide.

According to the second embodiment, the annular small side plate 8 is provided with the engagement projection 9 which is extended in the axial direction, and this engagement projection 9 is inserted with pressure into the window 22 of the large side plate 20. Accordingly, it is rendered possible to reduce the width dimension in the axial direction to the minimum, and at the same time, to further increase the frictional torque between the main body unit A of the oneway clutch and the outer race 1, or the like, at the time of idling rotation of the outer ring 1, or the like.

Note that the present invention is not limited to the embodiments described above, but may be altered in various manners.

What is claimed is:

1. A oneway clutch assembly, comprising:
   an outer race and an inner race;
   torque transmitting members disposed between said outer race and said inner race;
   a biasing spring for biasing said torque transmitting members;
   side plates disposed on both sides of said torque transmitting members in an axial direction thereof; and
   detachment preventing means for restricting movements of said torque transmitting members, said biasing spring, and said side plates in the axial direction, and being elastically engaged with said outer race or said inner race,
   wherein one of said side plates is provided with an engagement projection extended in the axial direction and said engagement projection is fitted in said detachment preventing means, and
   wherein said detachment preventing means includes a large side plate which is elastically engaged with said outer race.

2. A oneway clutch assembly according to claim 1, wherein said large side plate is provided with a window and said engagement projection is fitted in said window.

3. A oneway clutch assembly according to claim 1, wherein said engagement projection is fitted in said large side plate.

* * * * *